US012621149B2

(12) United States Patent
Ramaiah et al.

(10) Patent No.: US 12,621,149 B2
(45) Date of Patent: May 5, 2026

(54) SECURE COMPONENT VERIFICATION IN INFORMATION PROCESSING SYSTEM ENVIRONMENT

(71) Applicant: Dell Products L.P., Round Rock, TX (US)

(72) Inventors: Mahesh Babu Ramaiah, Bangalore (IN); Sudhansu Sekhar Sahu, Bangalore (IN); Joseph Brent Caisse, Burlington, MA (US)

(73) Assignee: Dell Products L.P., Round Rock, TX (US)

( * ) Notice: Subject to any disclaimer, the term of this patent is extended or adjusted under 35 U.S.C. 154(b) by 304 days.

(21) Appl. No.: 18/144,444

(22) Filed: May 8, 2023

(65) Prior Publication Data

US 2024/0380589 A1 Nov. 14, 2024

(51) Int. Cl.
$$\begin{array}{ll} \textbf{\textit{H04L 9/30}} & (2006.01) \\ \textbf{\textit{H04L 9/32}} & (2006.01) \\ \textbf{\textit{H04L 9/40}} & (2022.01) \end{array}$$

(52) U.S. Cl.
CPC .......... H04L 9/3073 (2013.01); H04L 9/3263 (2013.01); H04L 63/12 (2013.01)

(58) Field of Classification Search
CPC ..... H04L 9/3073; H04L 9/3263; H04L 63/12; H04L 9/3247; H04L 9/3268
See application file for complete search history.

(56) References Cited

U.S. PATENT DOCUMENTS

| | | | | |
|---|---|---|---|---|
| 2014/0330934 A1* | 11/2014 | O'Connor | .......... | H04N 21/8193 |
| | | | | 709/219 |
| 2019/0103961 A1* | 4/2019 | Chhabra | ............... | H04L 9/0838 |
| 2020/0074083 A1* | 3/2020 | Hou | .................... | G06F 11/1417 |
| 2022/0129349 A1* | 4/2022 | Chaiken | .............. | G06F 11/1417 |
| 2022/0405391 A1* | 12/2022 | Liu | ......................... | G06F 21/44 |
| 2023/0179430 A1* | 6/2023 | Parnerkar | ............... | B29C 45/76 |
| | | | | 713/156 |
| 2024/0012404 A1* | 1/2024 | Palmin | ............... | G05B 19/0428 |
| 2024/0323016 A1* | 9/2024 | Lambert | ............... | H04L 9/0841 |
| 2025/0184157 A1* | 6/2025 | Dover | ................... | G06F 21/575 |
| 2025/0279900 A1* | 9/2025 | Theocharis | ........ | G05B 19/0426 |

OTHER PUBLICATIONS

Wikipedia, "Trusted Platform Module," https://en.wikipedia.org/wiki/Trusted_Platform_Module, Apr. 3, 2023, 23 pages.

(Continued)

*Primary Examiner* — Philip J Chea
*Assistant Examiner* — Ghizlane Maazouz
(74) *Attorney, Agent, or Firm* — Ryan, Mason & Lewis, LLP

(57) ABSTRACT

Secure component verification for use in an information processing system environment is disclosed. For example, a method comprises storing a public key associated with a first component of a system on a second component of the system, and storing a public key associated with the second component on the first component. The public key associated with the first component and the public key associated with the second component are usable to respectively verify a trustworthiness of a replacement for the first component and a replacement for the second component.

20 Claims, 8 Drawing Sheets

(56) References Cited

OTHER PUBLICATIONS

C. Vavra, "Secure Device Onboarding for Manufacturing Supply Chain," https://www.controleng.com/articles/secure-device-onboarding-for-manufacturing-supply-chain/, Aug. 25, 2021, 9 pages.
W. Bartsch et al., "FIDO Device Onboard Specification," https://fidoalliance.org/specs/FDO/FIDO-Device-Onboard-RD-v1.0-20201202.html, Dec. 2, 2020, 132 pages.

* cited by examiner

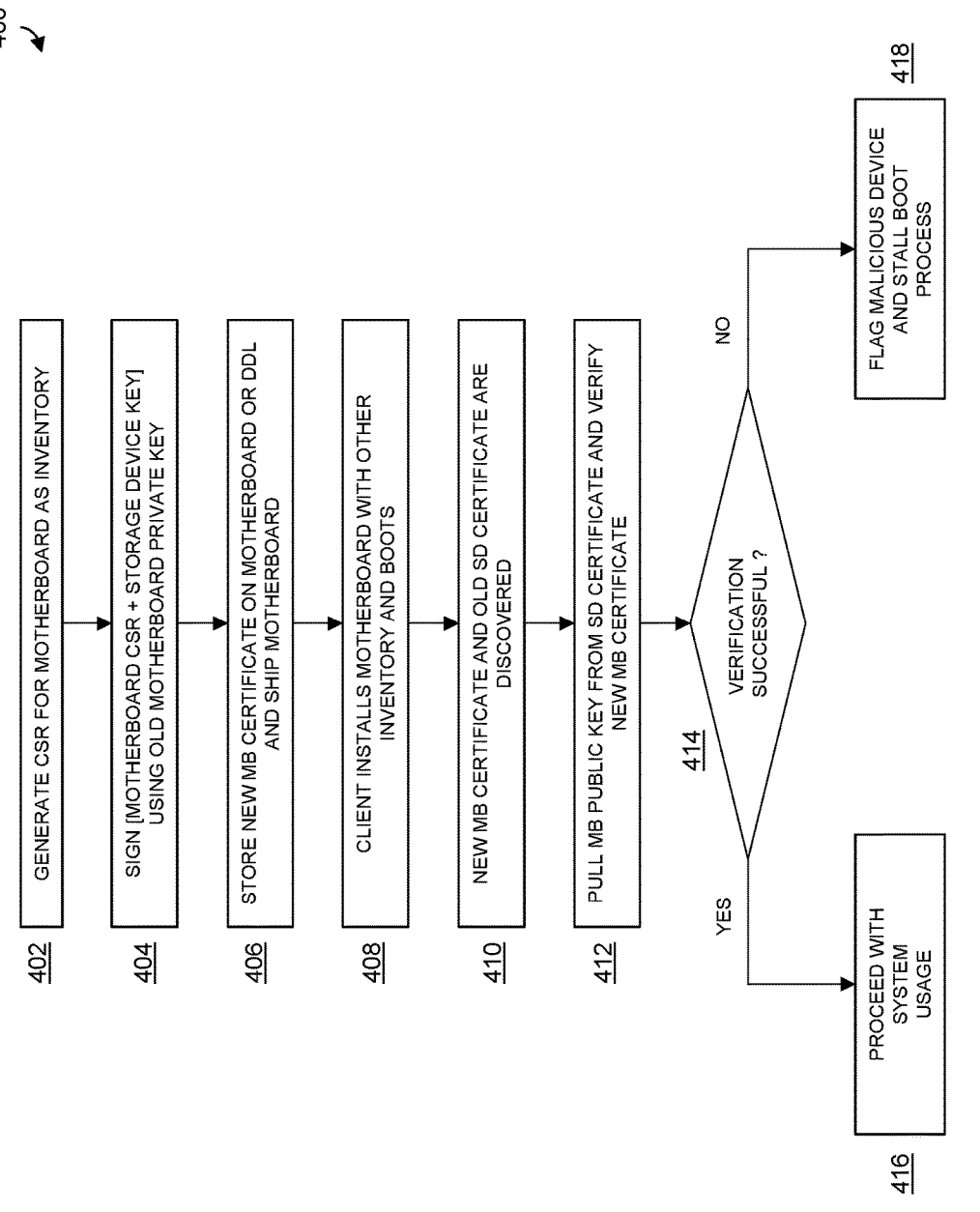

400

402 GENERATE CSR FOR MOTHERBOARD AS INVENTORY

404 SIGN [MOTHERBOARD CSR + STORAGE DEVICE KEY] USING OLD MOTHERBOARD PRIVATE KEY

406 STORE NEW MB CERTIFICATE ON MOTHERBOARD OR DDL AND SHIP MOTHERBOARD

408 CLIENT INSTALLS MOTHERBOARD WITH OTHER INVENTORY AND BOOTS

410 NEW MB CERTIFICATE AND OLD SD CERTIFICATE ARE DISCOVERED

412 PULL MB PUBLIC KEY FROM SD CERTIFICATE AND VERIFY NEW MB CERTIFICATE

414 VERIFICATION SUCCESSFUL ?

NO

418 FLAG MALICIOUS DEVICE AND STALL BOOT PROCESS

YES

416 PROCEED WITH SYSTEM USAGE

FIG. 4

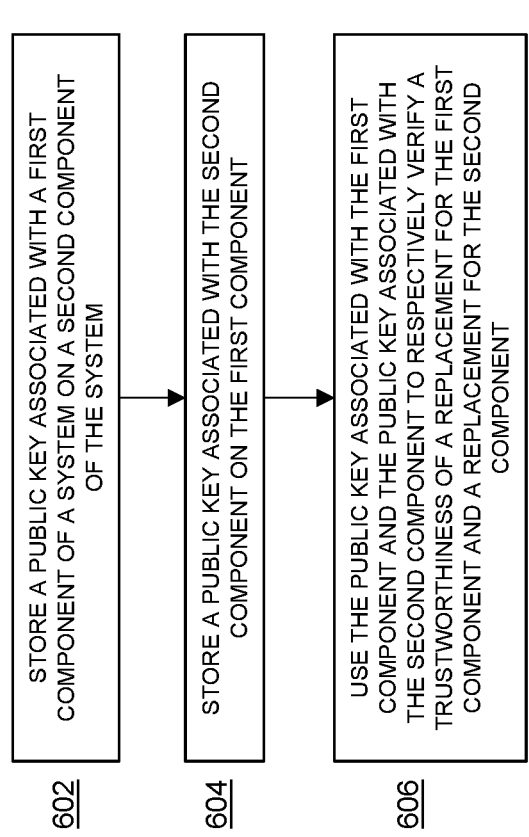

602 STORE A PUBLIC KEY ASSOCIATED WITH A FIRST COMPONENT OF A SYSTEM ON A SECOND COMPONENT OF THE SYSTEM

604 STORE A PUBLIC KEY ASSOCIATED WITH THE SECOND COMPONENT ON THE FIRST COMPONENT

606 USE THE PUBLIC KEY ASSOCIATED WITH THE FIRST COMPONENT AND THE PUBLIC KEY ASSOCIATED WITH THE SECOND COMPONENT TO RESPECTIVELY VERIFY A TRUSTWORTHINESS OF A REPLACEMENT FOR THE FIRST COMPONENT AND A REPLACEMENT FOR THE SECOND COMPONENT

FIG. 6

SECURE COMPONENT VERIFICATION IN INFORMATION PROCESSING SYSTEM ENVIRONMENT

FIELD

The field relates generally to information processing, and more particularly to techniques for managing information processing systems.

BACKGROUND

It is realized that deployed information processing systems often encounter faults and errors that require replacement of one or more components of the information processing systems. One non-limiting example is motherboard replacement in a computing system, e.g., a laptop, a desktop, a server, or any other processing device. By way of further example, such computing systems may be deployed in centralized computing networks (e.g., cloud computing networks) and/or distributed computing networks (e.g., edge computing networks).

A motherboard installed in an edge device (i.e., a computing system in an edge computing network) typically contains a trusted platform module (TPM) to store cryptographic keys that serve to provide encryption functionalities for the edge device. Such encryption functionalities are important in terms of device initialization and ownership voucher creation, which later comes into play for secure device onboarding (SDO). SDO is a software solution that automates the process of onboarding devices, such as edge devices. Onboarding is a process by which a device establishes its first trusted connection with a network or service with which the device will function. When an existing motherboard goes bad due to, for example, damage or fault, a replacement motherboard would come with a different set of TPM generated keys. This can pose significant challenges such as, but not limited to, performing the SDO process.

SUMMARY

Illustrative embodiments provide secure component verification for use in an information processing system environment.

In one illustrative embodiment, a method comprises storing a public key associated with a first component of a system on a second component of the system, and storing a public key associated with the second component on the first component. The public key associated with the first component and the public key associated with the second component are usable to respectively verify a trustworthiness of a replacement for the first component and a replacement for the second component.

For example, using the public key associated with the first component and the public key associated with the second component to respectively verify a trustworthiness of a replacement for the first component and a replacement for the second component may comprise one of the two following scenarios. Upon failure of the first component and receipt of the replacement for the first component, the method may obtain the public key associated with the first component from the second component and use the public key associated with the first component to verify the trustworthiness of the replacement for the first component against a private key associated with the first component used to digitally sign a first component certificate received with the replacement for the first component. Alternatively, upon failure of the second component and receipt of the replacement for the second component, the method may obtain the public key associated with the second component from the first component and use the public key associated with the second component to verify the trustworthiness of the replacement for the second component against a private key associated with the second component used to digitally sign a second component certificate received with the replacement for the second component.

Advantageously, illustrative embodiments overcome drawbacks that would arise by simply swapping components (e.g., motherboards and/or storage devices). For example, illustrative embodiments overcome device vulnerabilities caused by skipping or otherwise compromising secure device onboarding.

These and other illustrative embodiments include, without limitation, methods, apparatus, networks, systems and processor-readable storage media.

BRIEF DESCRIPTION OF THE DRAWINGS

FIG. 4 illustrates a process flow for secure component verification with respect to a first type of component according to an illustrative embodiment.

FIG. 6 shows a methodology for secure component verification according to an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud and edge computing and storage systems, as well as other types of processing systems comprising various combinations of physical and virtual processing resources.

Figure 1:
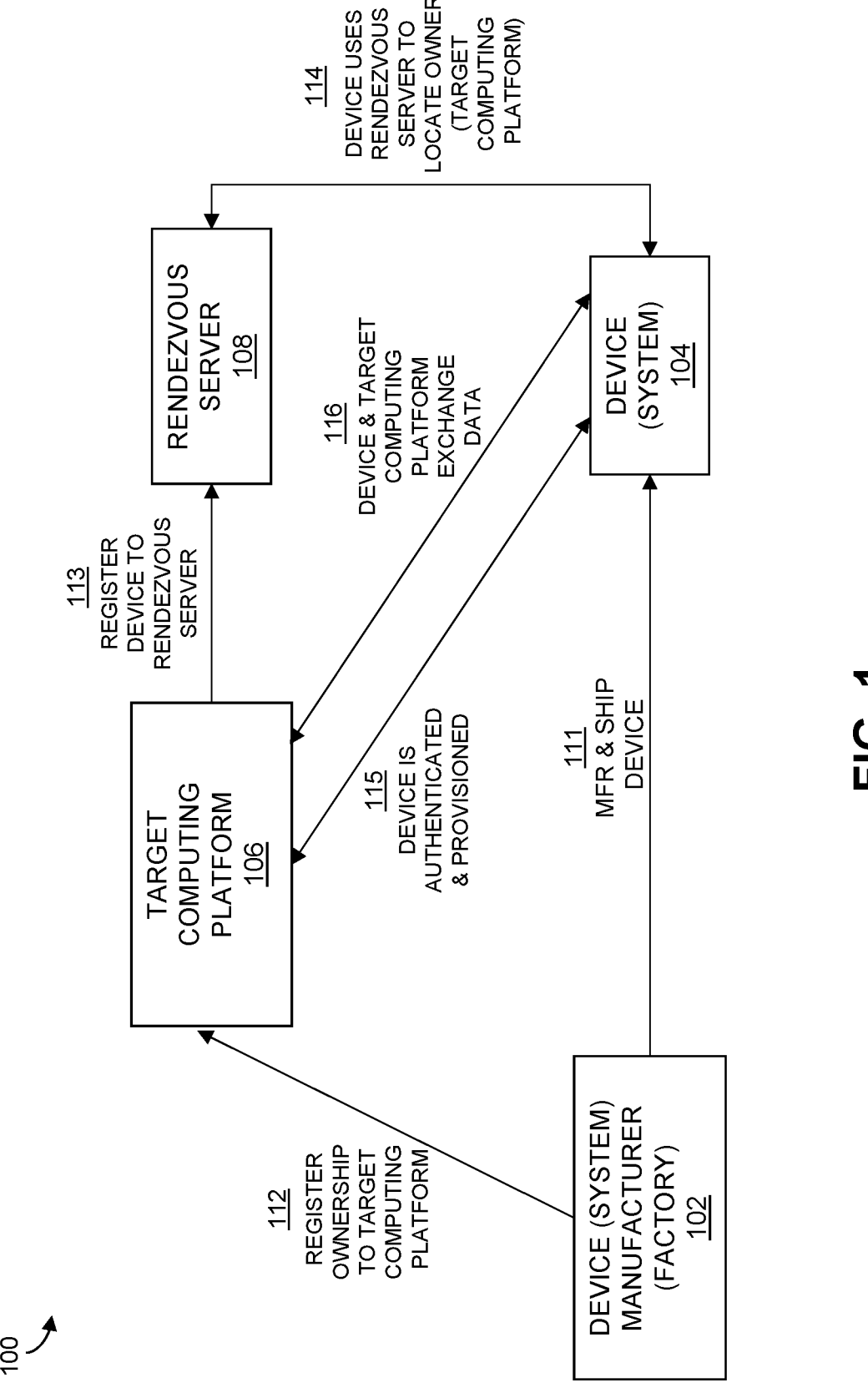
FIG. 1 illustrates an information processing system environment for secure device onboarding within which secure component verification functionalities according to one or more illustrative embodiments can be implemented.

By way of example only, FIG. 1 shows an information processing system environment 100 for a secure device onboarding (SDO) process. More particularly, as shown, a device (or system) manufacturer (or factory) 102 manufactures a device (or system) 104 and ships the device to a device recipient (client) in step 111. Assume that device 104 is an edge device, as mentioned above, that is remotely located with respect to a target computing platform 106, which is assumed to be the owner of device 104 (by ownership in this context, it is illustratively meant that device 104 will be assigned to operate or otherwise function with target computing platform 106, e.g., send and receive data, although ownership can also refer to the entity that actually purchased device 104 and may otherwise own/manage target computing platform 106).

Device manufacturer 102 therefore registers ownership of device 104 with target computing platform 106 via an ownership voucher in step 112. In some embodiments, the ownership voucher is a digital file that provides target computing platform 106 with the credentials to take ownership of device 104. Target computing platform 106 then registers its ownership of device 104 with a rendezvous server 108 in step 113.

Upon initial power on, device 104 is configured to contact rendezvous server 108 to locate its owner, i.e., target computing platform 106, in step 114. Device 104 and target computing platform 106 then perform a late binding provisioning process whereby device 104 is authenticated and provisioned to target computing platform 106 in step 115. In some embodiments, secure device onboarding is accomplished in accordance with an online process developed by the FIDO Alliance which uses public key cryptography techniques (cryptographic private key/public key pair) to provide authentication. Device 104 can now operate or otherwise function with target computing platform 106, e.g., send and receive data, in step 116.

As mentioned above, a motherboard installed in an edge device typically contains a trusted platform module (TPM) to store cryptographic keys that serve to provide encryption functionalities for the edge device, e.g., for use in authentication using a FIDO-based device onboarding (FDO) process. However, when an existing motherboard goes bad, a replacement motherboard would come with a different set of TPM generated keys. However, it is realized that simply swapping motherboards creates device vulnerabilities, both in the FDO process as well as in other security processes.

For example, in terms of edge use cases, device initialization gets skipped, due to the above-mentioned lack of TPM generated keys. This stalls the FDO process while trying to reach a rendezvous server (e.g., 108 in FIG. 1), as the ownership voucher is outdated as well. This situation creates a trust deficit scenario where the motherboard has to justify itself to be trustworthy.

Further, motherboard replacement can result in a loss of inventory details, i.e., information associated with the previous motherboard. In some embodiments, an application program validates the system inventory against an inventory certificate. Thus, an inventory certificate associated with the newly deployed motherboard would be a delta inventory certificate, which has to be rebuilt so as to contain a complete inventory list from information obtained from the inventory certificate associated with the previous motherboard.

Still further, it is realized that a replacement motherboard does not guarantee a logical association with the components that were part of the motherboard that went bad. This can be a problem in terms of adding a motherboard which is not sourced by the same manufacturer of the previous motherboard.

Note that while the above exemplary use case relates to motherboard replacement, the same or similar technical issues can exist for replacement of other components in electronic devices, for example, but not limited to, storage component (e.g., storage device such as, but not limited to, a storage drive) replacement.

As will be described in detail herein, illustrative embodiments overcome the above and other technical drawbacks associated with existing approaches, for example, by eliminating the above-mentioned trust deficit situation that arises in a component replacement. For example, illustrative embodiments provide secure component verification techniques that are configured to divide a component certificate into at least two mutually interlinked certificates secured in different parts of the system and a lock stepped model of counter approving when the component has to be replaced during the lifetime of the system. Advantageously, illustrative embodiments provide continuity and association of non-replaced components through the system lifecycle. While illustrative embodiments focus on motherboard and storage device type components in edge devices, alternative embodiments can be implemented with a wide variety of component types.

Figure 2:
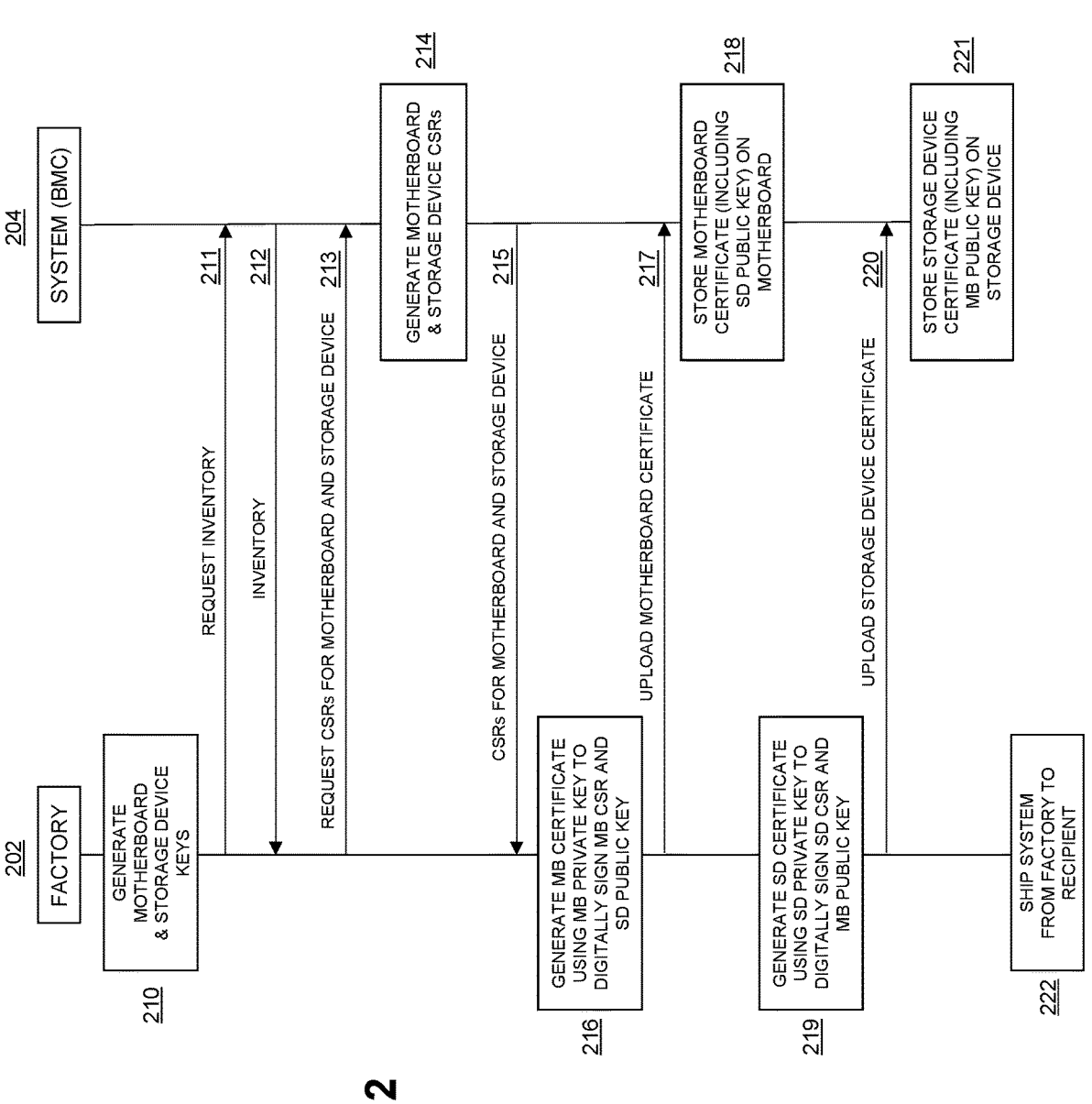
FIG. 2 illustrates a message flow with secure component verification functionalities according to an illustrative embodiment.

Referring now to FIG. 2, a message flow 200 with secure component verification functionalities is depicted according to an illustrative embodiment. As shown, message flow 200 involves a factory 202 and a system 204. With reference to the SDO process in FIG. 1, factory 202 corresponds to device manufacturer 102, while system 204 corresponds to device 104. It is assumed that system 204 is a computing system containing, among other components, a motherboard and a storage device, although, as mentioned above, these are only examples of components that can be used to implement one or more illustrative embodiments. System 204 can also comprise a baseboard management controller (BMC) which is a specialized processor that monitors the physical state of a computer, network server or other hardware device. As such, in some embodiments, it is to be understood that message flow 200 proceeds, at least in part, between a processing/communication device of factory 202 and the BMC or some other processing device of system 204.

Accordingly, as shown in step 210 of message flow 200, factory 202 generates two cryptographic key pairs (each key pair comprising a private key and corresponding a public key as is known in public key cryptography) for system 204. One of the key pairs is for the motherboard (occasionally abbreviated herein as MB) of system 204 and the other one of the key pairs for the storage device (occasionally abbreviated herein as SD) of system 204. The key pairs can be derived from an intermediate certificate authority (CA) or a factory CA. As will be explained further, key pairs are used for digital signing during every motherboard/storage replacement scenario.

In steps 211 and 212 of message flow 200, factory 202 collects all the inventory associated with system 204 which includes motherboard, storage device, and other components. More particularly, factory 202 requests the inventory in step 211, and system 204 responds with the inventory information in step 212.

Then, in step 213, factory 202 requests a certificate signing request (CSR) from system 204 for input inventory for: (i) the motherboard and other related components, excluding the storage device inventory (henceforth called a motherboard CSR); and (ii) the storage device and other related components, excluding the motherboard inventory (henceforth called a storage device CSR).

In step 214, system 204 generates the requested CSRs and sends them to factory 202 in step 215.

In step 216, factory 202 generates a motherboard certificate using the motherboard private key (generated as part of the motherboard key pair along with the corresponding motherboard public key) to digitally sign the motherboard CSR and the storage device public key (generated as part of the storage device key pair along with the corresponding storage device private key). This ties the motherboard with the storage device, which are part of the same system (system 204).

The motherboard certificate is uploaded by factory 202 to system 204 in step 217, which then securely stores the motherboard certificate, which includes the storage device public key, on the motherboard in step 218.

In step 219, factory 202 similarly generates a storage device certificate using the storage device private key (generated as part of the storage device key pair along with the corresponding storage device public key) to digitally sign the storage device CSR and the motherboard public key (generated as part of the motherboard key pair along with the corresponding motherboard private key). This ties the storage device with the motherboard, which are part of the same system (system 204).

The storage device certificate is uploaded by factory 202 to system 204 in step 220, which then securely stores the storage device certificate, which includes the motherboard public key, on the storage device in step 221. In some embodiments, the storage device certificate can be replicated in one or more other storage devices of system 204.

In step 222, system 204 is shipped from factory 202 to recipient destination.

Figure 3:
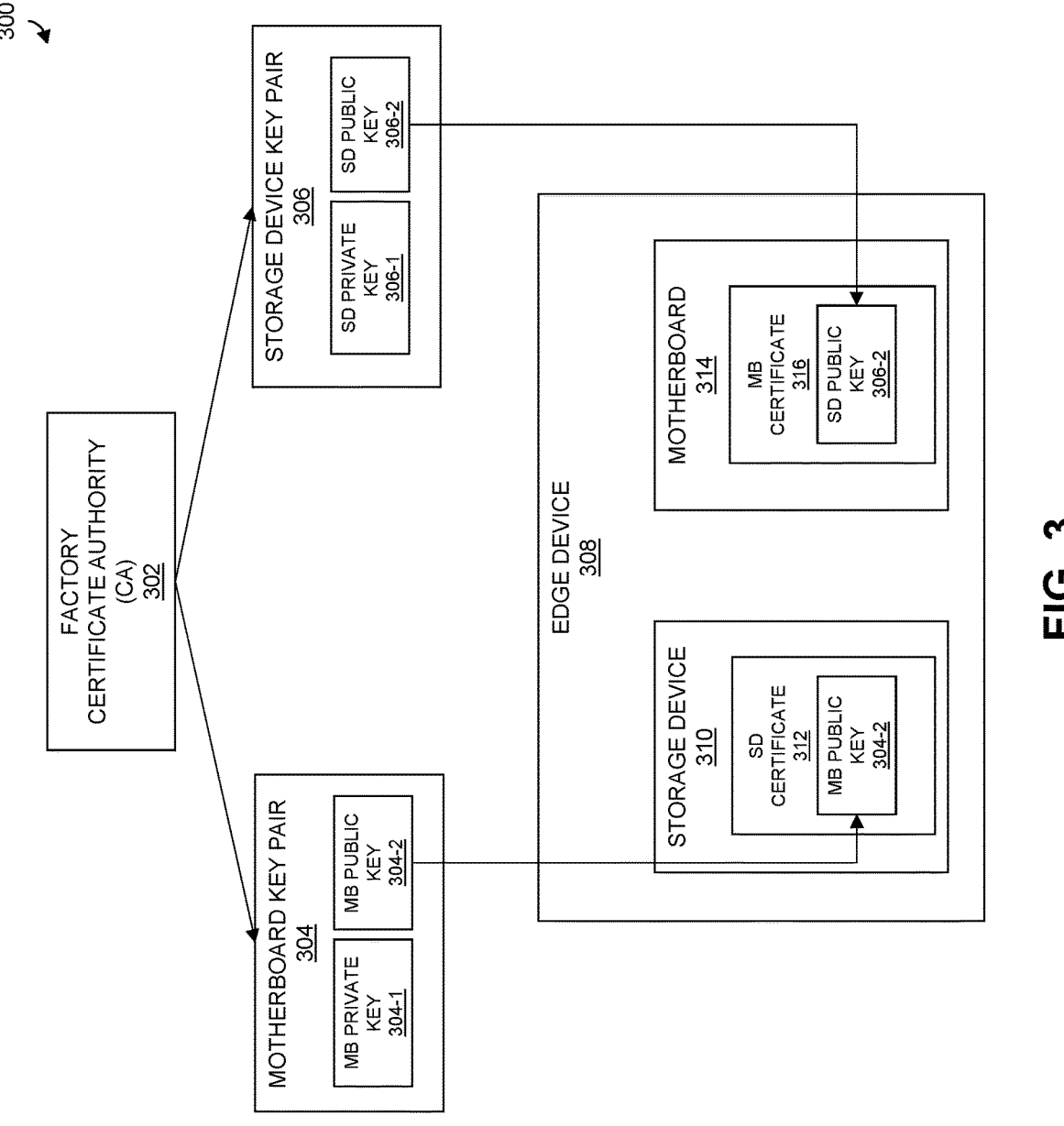
FIG. 3 illustrates a factory deployment environment for an edge device according to an illustrative embodiment.

Referring now to FIG. 3, a factory deployment environment 300 is shown for a scenario when system 204 is an edge device according to an illustrative embodiment. As shown, factory CA 302 generates: (i) a motherboard key pair 304 with a motherboard private key 304-1 and a corresponding motherboard public key 304-2; and (ii) a storage device key pair 306 with a storage device private key 306-1 and a corresponding storage key public key 306-2. Further, as explained above in accordance with message flow 200, an edge device 308 comprises a storage device 310 and a motherboard 314. On storage device 310, a storage device certificate 312 (generated by factory 202) is securely stored and comprises motherboard public key 304-2 and the storage device CSR (not expressly shown). On motherboard 314, a motherboard certificate 316 (generated by factory 202) is securely stored and comprises storage device public key 306-2 and the motherboard CSR (not expressly shown).

Storage device certificate 312 and motherboard certificate 316 are considered to two mutually interlinked certificates secured in different parts of edge device 308 (storage device certificate 312 in storage device 310 and motherboard certificate 316 in motherboard 314). They are considered interlinked in that storage device certificate 312 comprises motherboard public key 304-2, while motherboard certificate 316 comprises storage device public key 306-2.

Recall that following the factory-based deployment of storage device certificate 312 and motherboard certificate 316, edge device 308 (system 204) is shipped to a recipient and will eventually be authenticated and provisioned in accordance with an SDO process to a target computing platform (e.g., target computing platform 106 in FIG. 1).

Assume now that, at the recipient location, edge device 308 has a failure and it is determined that the failure is due to a bad (e.g., malfunctioning or otherwise non-functioning) motherboard 314. FIG. 4 illustrates a process flow 400 for secure component verification with respect to a replacement of motherboard according to an illustrative embodiment. Process flow 400 is considered a lock stepped model of counter approving when motherboard 314 has to be replaced during the lifetime of edge device 308. By lock stepped, it is generally meant that a set of sequential steps are performed to securely verify the replacement motherboard via a new motherboard certificate by counter approval using the existing storage device certificate.

In step 402, factory 202 creates a new CSR for the replacement motherboard inventory and, in step 404, signs the combination of [motherboard CSR+storage device public key 306-2] using motherboard private key 304-1. This forms a new motherboard certificate which, in step 406, is stored on the replacement motherboard or a dynamic link library (DLL) file. The replacement motherboard along with the new motherboard certificate is shipped to the recipient (client) location.

In step 408, the client replaces the failed motherboard 314 with the replacement motherboard (i.e., installs the replacement motherboard into the system in place of the failed motherboard) and triggers a power on of edge device 308. The boot flow reads the new motherboard certificate stored on the replacement motherboard and the existing storage device certificate 312 stored on storage device 310, in step 410.

From the storage device certificate 312, in step 412, the motherboard public key 304-2 is read (pulled) and used to verify, in step 414, the digital signature (created via the motherboard private key 304-1) of the new motherboard certificate.

If verification in step 414 is successful, in step 416, edge device 308 with the replacement motherboard can continue to boot for use in operations with target computing platform 106. However, if verification in step 414 is unsuccessful, in step 418, edge device 308 with the replacement motherboard halts booting. Edge device 308 is then flagged as a malicious device and thus is not permitted for use in operations with target computing platform 106.

Figure 5:
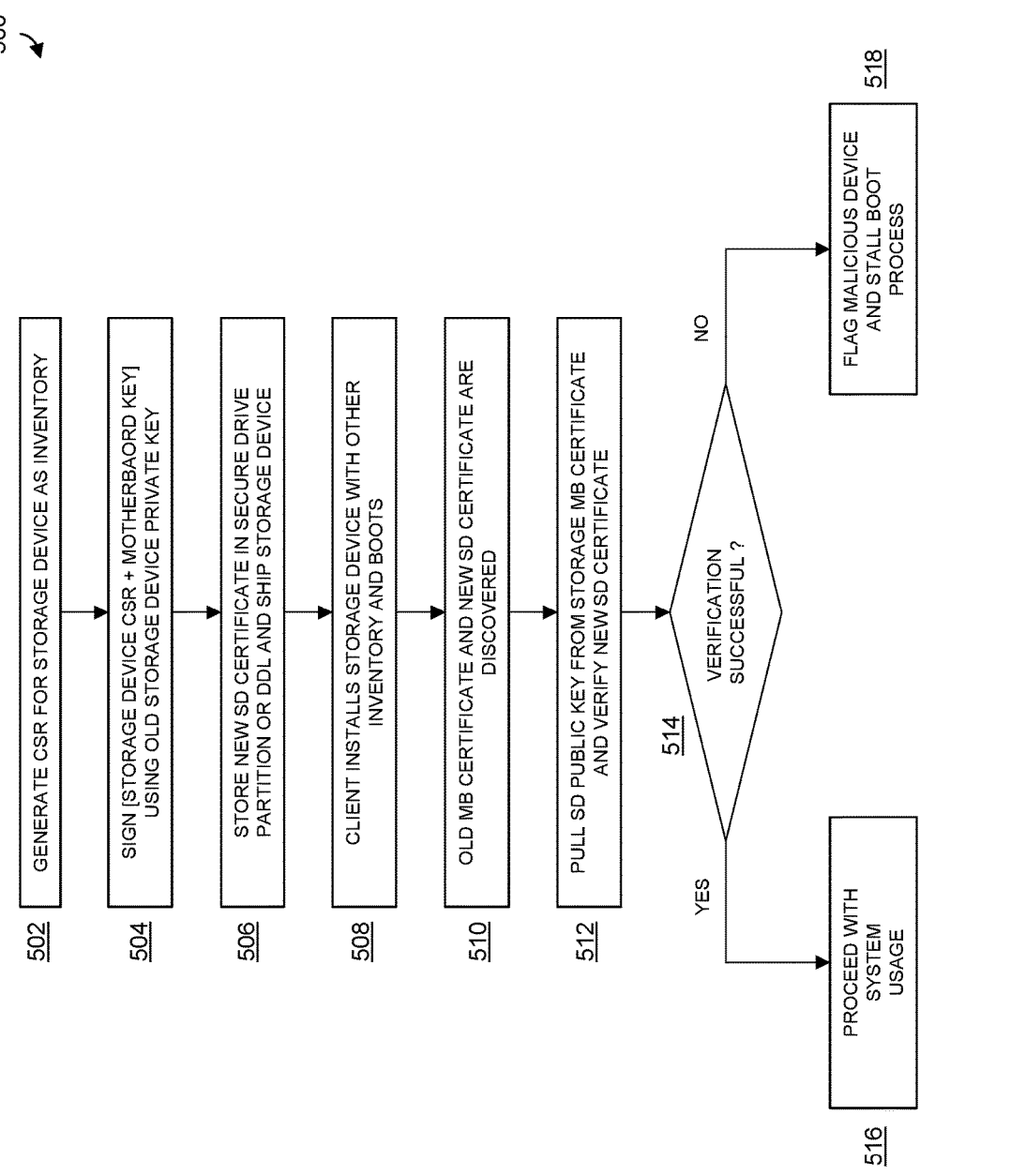
FIG. 5 illustrates a process flow for secure component verification with respect to a second type of component according to an illustrative embodiment.

Assume instead that, at the recipient location, edge device 308 has a failure and it is determined that the failure is due to a bad (e.g., malfunctioning or otherwise non-functioning) storage device 310. FIG. 5 illustrates a process flow 500 for secure component verification with respect to replacement of a storage device according to an illustrative embodiment. Process flow 500 is considered a lock stepped model of counter approving when storage device 310 has to be replaced during the lifetime of edge device 308. Similarly, lock stepped generally means that a set of sequential steps are performed to securely verify the replacement storage device via a new storage device certificate by counter approval using the existing motherboard certificate.

In step 502, factory 202 creates a new CSR for the replacement storage device inventory and, in step 504, signs the combination of [storage device CSR+motherboard public key 304-2] using storage device private key 306-1. This forms a new storage device certificate which, in step 506, is stored on the replacement storage device or a dynamic link library (DLL) file on the replacement storage device. The replacement storage device along with the new storage device certificate is shipped to the recipient (client) location.

In step 508, the client replaces the failed storage device 310 with the replacement storage device (i.e., installs the replacement storage device into the system in place of the failed storage device) and triggers a power on of edge device 308. The boot flow reads the new storage device certificate stored on the replacement storage device and the existing motherboard certificate 316 on motherboard 314, in step 510.

From the motherboard certificate 316, in step 512, the storage device public key 306-2 is read (pulled) and used to verify, in step 514, the digital signature (created via the storage device private key 306-1) of the new storage device certificate.

If verification in step 514 is successful, in step 516, edge device 308 with the replacement storage device can continue to boot for use in operations with target computing platform 106. However, if verification in step 514 is unsuccessful, in step 518, edge device 308 with the replacement storage device halts booting. Edge device 308 is then flagged as a malicious device (i.e., since it has a storage device from an untrusted source) and thus is not permitted for use in operations with target computing platform 106.

Advantageously, illustrative embodiments enable a process that eliminates the above-mentioned trust deficit situation that arises in a component replacement by providing secure component verification techniques that are configured to divide a component certificate into at least two mutually interlinked certificates secured in different parts of the system and a lock stepped model of counter approving (verification) when the component has to be replaced during the lifetime of the system. As such, illustrative embodiments provide continuity and association of non-replaced components through the system lifecycle. As mentioned above, illustrative embodiments focus on motherboard and storage device components in edge devices.

FIG. 6 shows a methodology 600 for secure component verification according to an illustrative embodiment. As shown, step 602 stores a public key associated with a first component of a system on a second component of the system. Step 604 stores a public key associated with the second component on the first component. Step 606 uses the public key associated with the first component and the public key associated with the second component to respectively verify a trustworthiness of a replacement for the first component and a replacement for the second component.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for secure component verification will now be described in greater detail with reference to FIGS. 7 and 8. Although described in the context of information processing system environment 100, these platforms may also be used to implement at least portions of other information processing systems in other embodiments.

Figure 7:
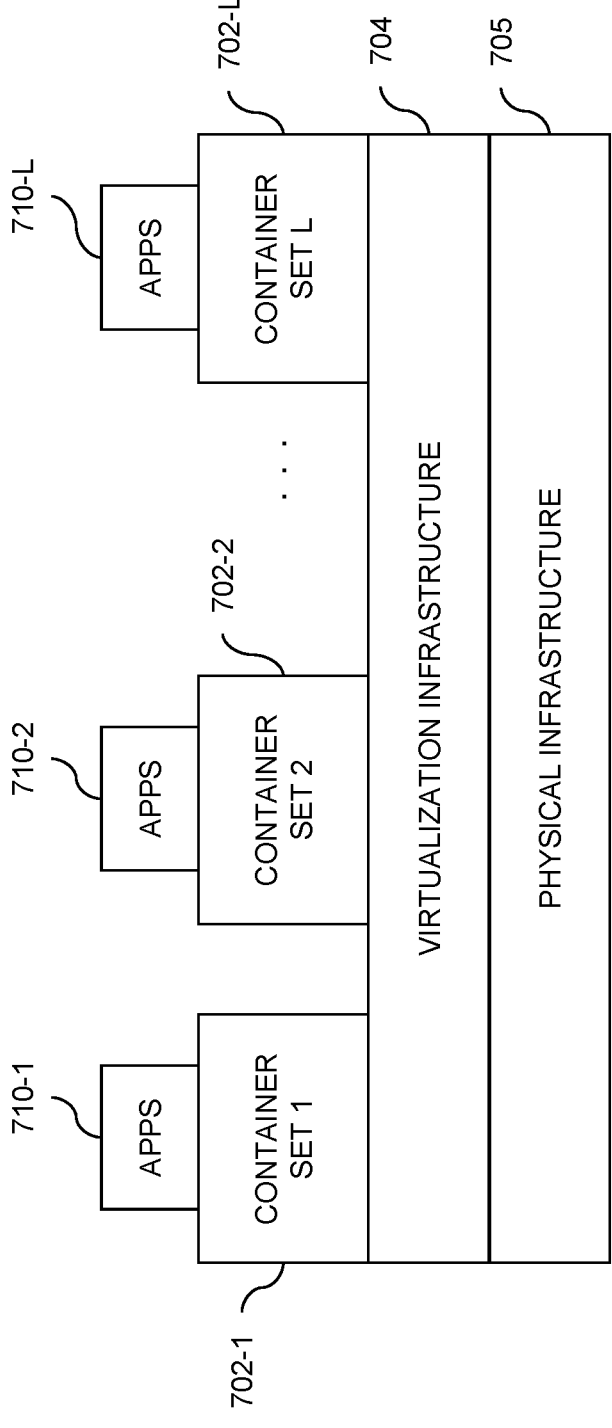
FIGS. 7 and 8 illustrate examples of processing platforms that may be utilized to implement at least a portion of an information processing system in illustrative embodiments.
Figure 8:
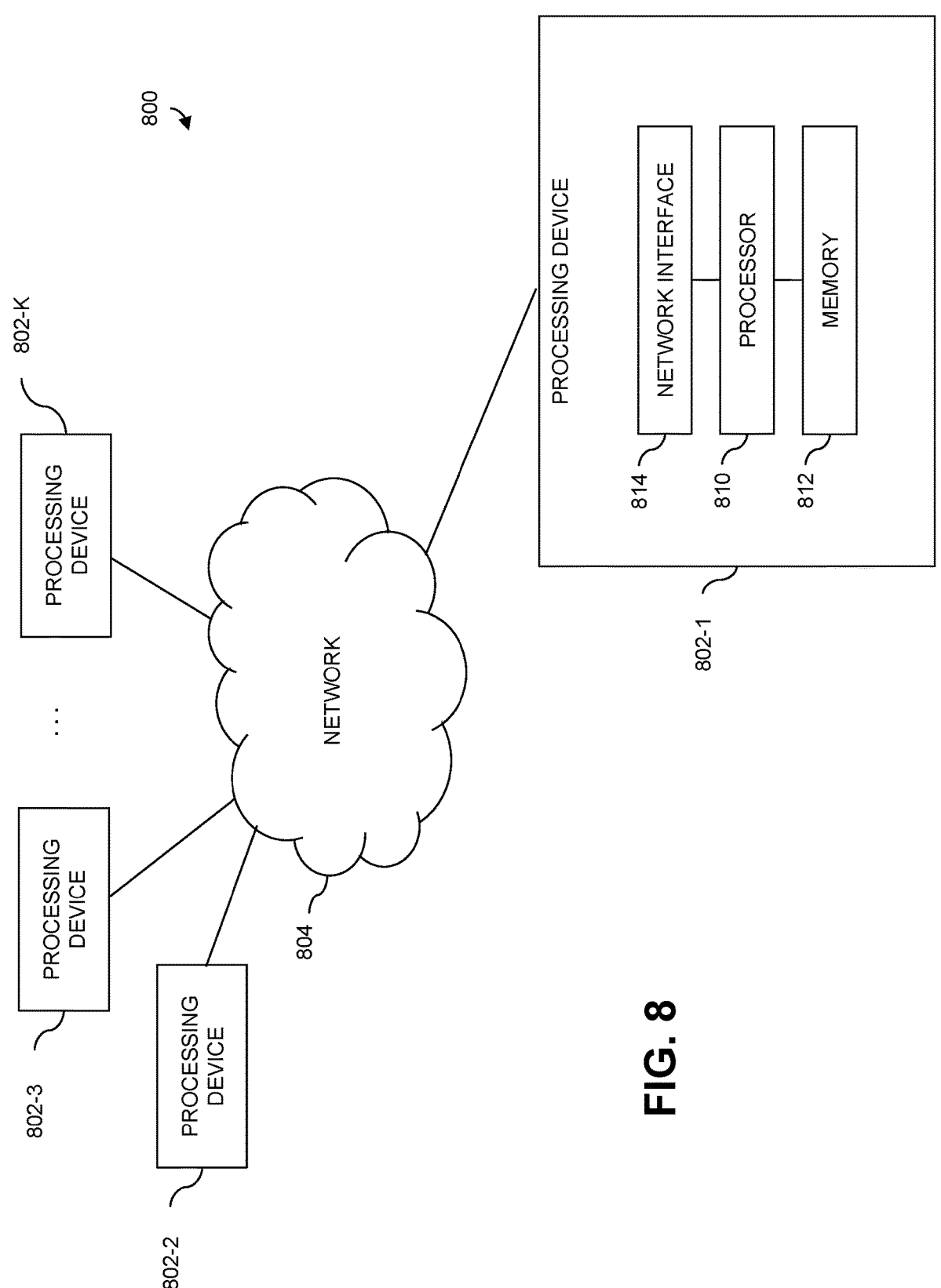

FIG. 7 shows an example processing platform comprising infrastructure 700. Infrastructure 700 comprises a combination of physical and virtual processing resources that may be utilized to implement at least a portion of the information processing system environment 100 in FIG. 1. Infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

Infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of information processing system environment 100 may each run on a computer, server, storage device or other processing platform element. A given such element may be viewed as an example of what is more generally referred to herein as a "processing device." Infrastructure 700 shown in FIG. 7 may represent at least a portion of one processing platform. Another example of such a processing platform is processing platform 800 shown in FIG. 8.

The processing platform 800 in this embodiment comprises at least a portion of information processing system environment 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and information processing system environment 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for application monitoring with predictive anomaly detection and fault isolation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, edge computing environments, applications, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

storing a public key associated with a first component of a system on a second component of the system; and storing a public key associated with the second component on the first component;

wherein the public key associated with the first component and the public key associated with the second component are usable to respectively verify a trustworthiness of a replacement for the first component and a replacement for the second component, and wherein the verifying of the trustworthiness of the replacement for the first component is enabled to use a private key that is associated with the public key of the first component and is storable by a device manufacturer of the first component to enable signing a certificate signing request by the device manufacturer of the first component, and the verifying of the trustworthiness of the replacement for the second component is enabled to use a private key that is associated with the public key of the second component and is storable by a device manufacturer of the second component to enable signing a certificate signing request by the device manufacturer of the second component;

wherein using the public key associated with the first component and the public key associated with the second component to respectively verify a trustworthiness of a replacement for the first component and a replacement for the second component further comprises:

upon failure of the first component and receipt of the replacement for the first component, obtaining the public key associated with the first component from the second component and using the public key associated with the first component to verify the trustworthiness of the replacement for the first component against the private key associated with the first component used to digitally sign a first component certificate received with the replacement for the first component; and upon failure of the second component and receipt of the replacement for the second component, obtaining the public key associated with the second component from the first component and using the public key associated with the second component to verify the trustworthiness of the replacement for the second component against the private key associated with the second component used to digitally sign a second component certificate received with the replacement for the second component.

2. The method of claim 1, wherein the public key and the private key associated with the first component form a first component key pair, and the public key and the private key associated with the second component form a second component key pair, wherein the first component key pair and the second component key pair are each generated using public key cryptography.

3. The method of claim 2, wherein the first component key pair and the second component key pair are caused to be generated by a manufacturer of the system prior to delivery of the system to a client destination.

4. The method of claim 1, wherein:

the public key associated with the first component stored on the second component is stored in a second component certificate generated for the second component which also comprises a second component certificate signing request, and wherein the second component certificate is digitally signed using the private key associated with the second component; and the public key associated with the second component stored on the first component is stored in a first component certificate generated for the first component which also comprises a first component certificate signing request, and wherein the first component certificate is digitally signed using the private key associated with the first component.

5. The method of claim 4, further comprising:

during a boot process for the system with the replacement for the first component installed, pulling the public key associated with the first component stored in the second component certificate and using the public key associated with the first component to verify a digital signature of the first component certificate received with the replacement of the first component; and during a boot process for the system with the replacement for the second component installed, pulling the public key associated with the second component stored in the first component certificate and using the public key associated with the second component to verify a digital signature of the second component certificate received with the replacement of the second component.

6. The method of claim 1, further comprising:

permitting the system to boot when the verification is successful; and preventing the system from booting when the verification is unsuccessful.

7. The method of claim 1, wherein the first component comprises a motherboard and the second component comprises a storage device.

8. The method of claim 1, wherein the system comprises an edge device configured to perform, upon booting up, a secure device onboarding process in accordance with a target computing platform.

9. An apparatus comprising:

at least one processing platform comprising at least one processor coupled to at least one memory, the at least one processing platform, when executing program code, is configured to:

cause storage of a public key associated with a first component of a system on a second component of the system; and cause storage of a public key associated with the second component on the first component; wherein the public key associated with the first component and the public key associated with the second component are usable to respectively verify a trustworthiness of a replacement for the first component and a replacement for the second component, and wherein the verifying of the trustworthiness of the replacement for the first component is enabled to use a private key that is associated with the public key of the first component and is storable by a device manufacturer of the first component to enable signing a certificate signing request by the device manufacturer of the first component, and the verifying of the trustworthiness of the replacement for the second component is enabled to use a private key that is associated with the public key of the second component and is storable by a device manufacturer of the second component to enable signing a certificate signing request by the device manufacturer of the second component;

wherein using the public key associated with the first component and the public key associated with the second component to respectively verify a trustworthiness of a replacement for the first component and a replacement for the second component further comprises:

upon failure of the first component and receipt of the replacement for the first component, obtaining the public key associated with the first component from the second component and using the public key associated with the first component to verify the trustworthiness of the replacement for the first component against the private key associated with the first component used to digitally sign a first component certificate received with the replacement for the first component; and upon failure of the second component and receipt of the replacement for the second component, obtaining the public key associated with the second component from the first component and using the public key associated with the second component to verify the trustworthiness of the replacement for the second component against the private key associated with the second component used to digitally sign a second component certificate received with the replacement for the second component.

10. The apparatus of claim 9, wherein the public key and the private key associated with the first component form a first component key pair, and the public key and the private key associated with the second component form a second component key pair, wherein the first component key pair and the second component key pair are each generated using public key cryptography.

11. The apparatus of claim 10, wherein the first component key pair and the second component key pair are caused to be generated by a manufacturer of the system prior to delivery of the system to a client destination.

12. The apparatus of claim 9, wherein:

the public key associated with the first component stored on the second component is stored in a second component certificate generated for the second component which also comprises a second component certificate signing request, and wherein the second component certificate is digitally signed using the private key associated with the second component; and the public key associated with the second component stored on the first component is stored in a first component certificate generated for the first component which also comprises a first component certificate signing request, and wherein the first component certificate is digitally signed using the private key associated with the first component.

13. A computer program product comprising a non-transitory processor-readable storage medium having stored therein program code of one or more software programs, wherein the program code when executed by at least one processing device causes the at least one processing device to:

cause storage of a public key associated with a first component of a system on a second component of the system; and cause storage of a public key associated with the second component on the first component;

wherein the public key associated with the first component and the public key associated with the second component are usable to respectively verify a trustworthiness of a replacement for the first component and a replacement for the second component, and wherein the verifying of the trustworthiness of the replacement for the first component is enabled to use a private key that is associated with the public key of the first component and is storable by a device manufacturer of the first component to enable signing a certificate signing request by the device manufacturer of the first component, and the verifying of the trustworthiness of the replacement for the second component is enabled to use a private key that is associated with the public key of the second component and is storable by a device manufacturer of the second component to enable signing a certificate signing request by the device manufacturer of the second component;

wherein using the public key associated with the first component and the public key associated with the second component to respectively verify a trustworthiness of a replacement for the first component and a replacement for the second component further comprises:

upon failure of the first component and receipt of the replacement for the first component, obtaining the public key associated with the first component from the second component and using the public key associated with the first component to verify the trustworthiness of the replacement for the first component against the private key associated with the first component used to digitally sign a first component certificate received with the replacement for the first component; and upon failure of the second component and receipt of the replacement for the second component, obtaining the public key associated with the second component from the first component and using the public key associated with the second component to verify the trustworthiness of the replacement for the second component against the private key associated with the second component used to digitally sign a second component certificate received with the replacement for the second component.

14. The computer program product of claim 13, wherein the public key and the private key associated with the first component form a first component key pair, and the public key and the private key associated with the second component form a second component key pair, wherein the first component key pair and the second component key pair are each generated using public key cryptography.

15. The computer program product of claim 14, wherein the first component key pair and the second component key pair are caused to be generated by a manufacturer of the system prior to delivery of the system to a client destination.

16. The computer program product of claim 13, wherein: the public key associated with the first component stored on the second component is stored in a second component certificate generated for the second component which also comprises a second component certificate signing request, and wherein the second component certificate is digitally signed using the private key associated with the second component; and the public key associated with the second component stored on the first component is stored in a first component certificate generated for the first component which also comprises a first component certificate signing request, and wherein the first component certificate is digitally signed using the private key associated with the first component.

17. The computer program product of claim 16, further comprising:

during a boot process for the system with the replacement for the first component installed, pulling the public key associated with the first component stored in the second component certificate and using the public key associated with the first component to verify a digital signature of the first component certificate received with the replacement of the first component; and during a boot process for the system with the replacement for the second component installed, pulling the public key associated with the second component stored in the first component certificate and using the public key associated with the second component to verify a digital signature of the second component certificate received with the replacement of the second component.

18. The computer program product of claim 13, further comprising:

permitting the system to boot when the verification is successful; and preventing the system from booting when the verification is unsuccessful.

19. The computer program product of claim 13, wherein the first component comprises a motherboard and the second component comprises a storage device.

20. The computer program product of claim 13, wherein the system comprises an edge device configured to perform, upon booting up, a secure device onboarding process in accordance with a target computing platform.

* * * * *